No. 695,633. Patented Mar. 18, 1902.
D. M. COX.
FARM OR YARD GATE.
(Application filed Dec. 4, 1901.)
(No Model.) 3 Sheets—Sheet 1.
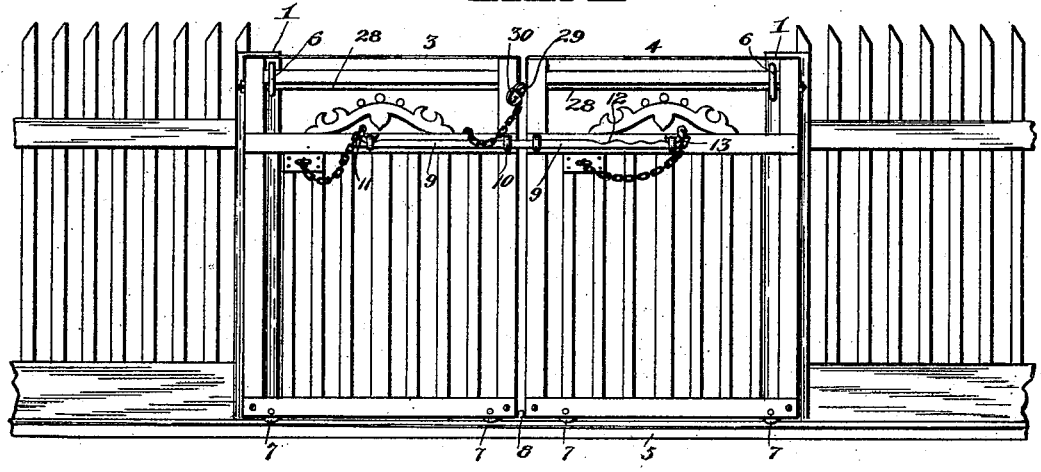
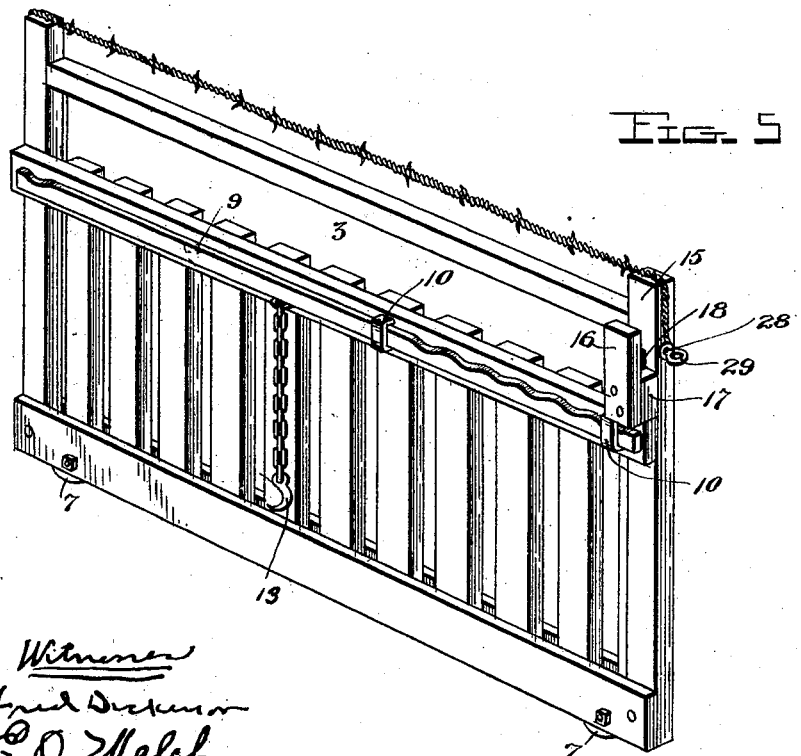

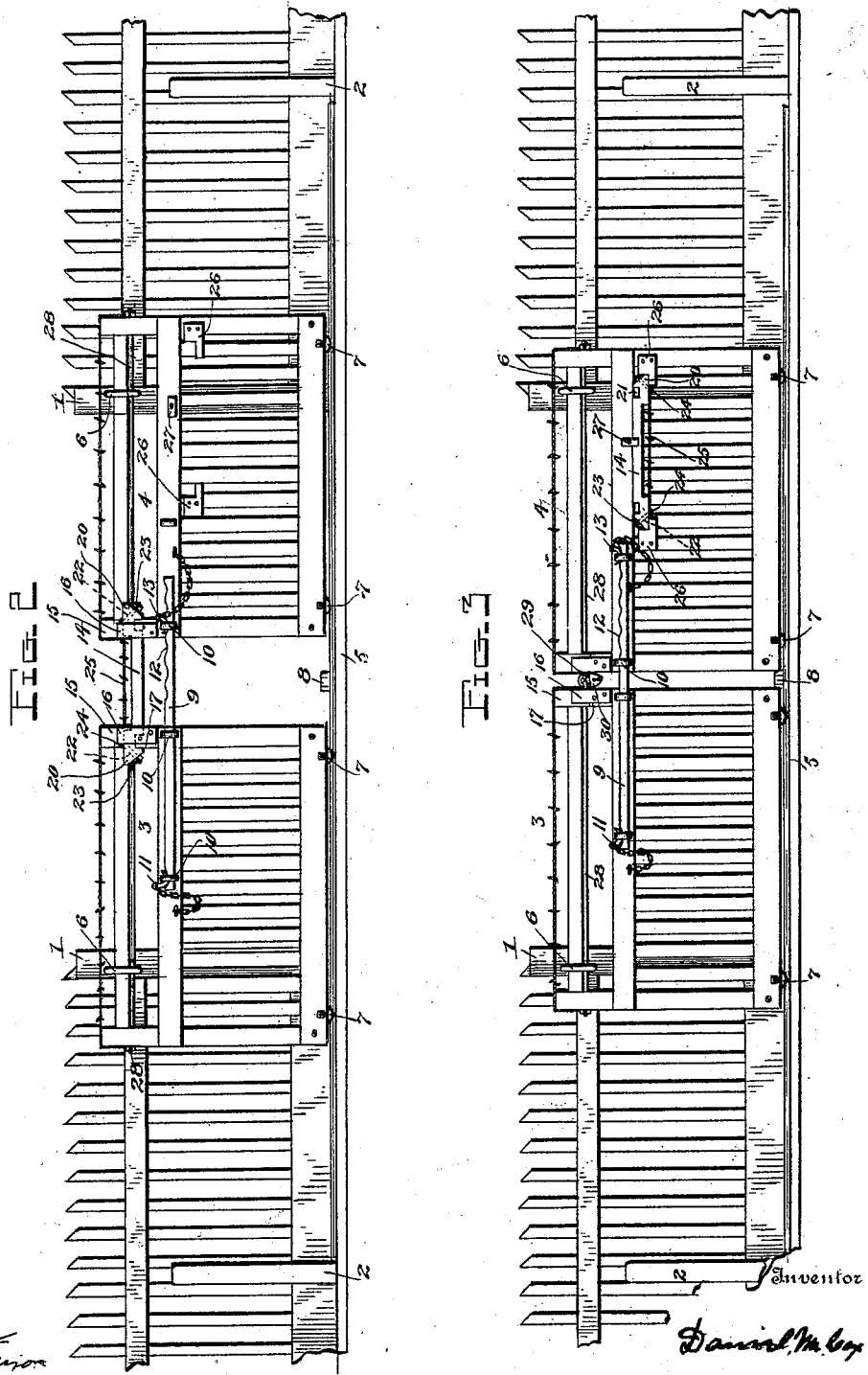

No. 695,633. Patented Mar. 18, 1902.
D. M. COX.
FARM OR YARD GATE.
(Application filed Dec. 4, 1901.)
(No Model.) 3 Sheets—Sheet 3.
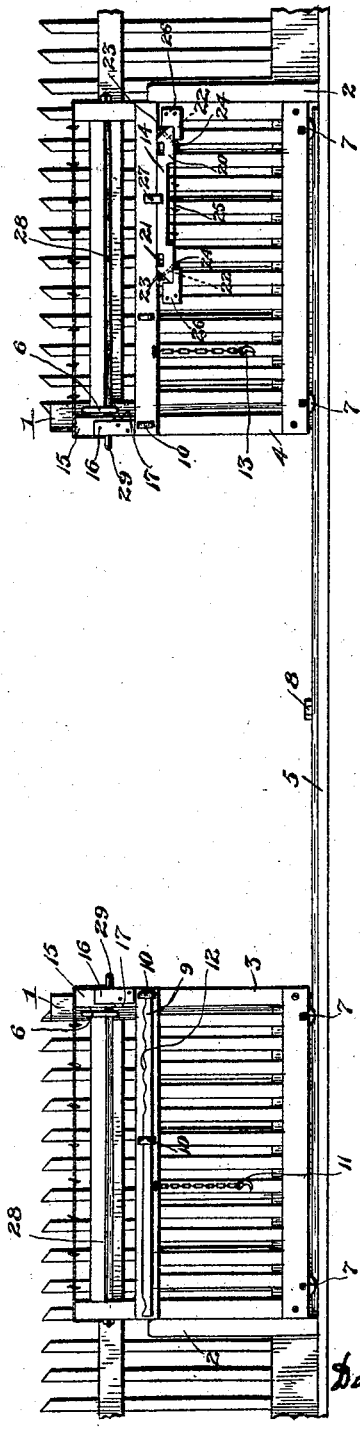

UNITED STATES PATENT OFFICE.

DANIEL M. COX, OF MOULTON, IOWA.

FARM OR YARD GATE.

SPECIFICATION forming part of Letters Patent No. 695,633, dated March 18, 1902.

Application filed December 4, 1901. Serial No. 84,642. (No model.)

*To all whom it may concern:*

Be it known that I, DANIEL M. COX, a citizen of the United States, residing at Moulton, in the county of Appanoose and State of Iowa, have invented certain new and useful Improvements in Farm or Yard Gates; and I do declare the following to be a full, clear, and exact description of the invention, such as will enable others skilled in the art to which it appertains to make and use the same.

The invention relates to farm or yard gates.

The object of the invention is to provide a gate of this character which shall be simple of construction, durable in use, comparatively inexpensive of production, and which may be easily and quickly opened or closed with a minimum amount of effort and which may be adjusted to vary the opening between the gate-sections to permit of the passage therethrough of fowls and smaller animals and prevent the passage of larger animals.

With this and other objects in view the invention consists of certain novel features of construction, combination, and arrangement of parts, which will be hereinafter more fully described, and particularly pointed out in the appended claims.

In the accompanying drawings, Figure 1 is a front view showing my improved gate when used as a yard-gate, it being shown in its closed position. Fig. 2 is a similar view of the gate when used as a farm-gate, the sections of the gate being shown separated to permit of the passage therebetween of fowl and animals of the smaller class, the sections being held in such position by the locking-bar. Fig. 3 is a similar view showing the gate closed. Fig. 4 is a similar view showing the gate opened its entire limit; and Fig. 5 is a detail perspective view, on an enlarged scale, of one of the gate-sections.

Referring to the drawings, 1 denotes the gate-posts, 2 the stop-posts, 3 and 4 the gate-sections, and 5 the sill. Each gate-section is connected to its respective post by a guide-keeper 6 and is provided at its lower edge with supporting-rollers 7, which when the sill has a curved or convex tread will be formed with a concaved or curved periphery to fit said tread. The form of the sill and the peripheries of the supporting-rollers may be changed at pleasure without departing from my invention, and I would therefore have it distinctly understood that the form shown in the accompanying drawings, while preferred, is not absolutely essential or necessary.

8 denotes a stop-block mounted upon the sill centrally of the gate-opening and provided at its ends with strips of leather or rubber to receive the impact of the lower corners of the gate-sections and prevent damage thereto, as well as to lessen the noise when the gate-sections are suddenly closed.

9 denotes a locking-bar, which is mounted to slide in keepers 10, secured to the gate-sections, and span the opening between said sections and is prevented from accidental disengagement from said keepers by the chains 11, attached to the gate-sections. The upper edge of this bar is provided with curved recesses or corrugations 12, which receive a curved locking-key 13, chained to the gate-section, said key being wedged in between the bar and the keeper and serving to lock said bar to the keeper and hold the gate-section in its adjusted position, as shown in Fig. 2 of the drawings.

If the gate be used for farm purposes, I employ a guard-bar 14, which serves to prevent larger animals from forcing their way through the space between the gate-sections when said sections are separated to permit of the passage of fowl and smaller animals. When this guard-bar is used, I bolt to the inner vertical stile 15 of each gate-section a substile 16, between which and the upper end of the vertical stiles 15 is fixed a block 17, having an angular shoulder 18. The guard-bar is provided at each end with an elevated head 20, having in its lower edge a notch 21 to receive the shoulder 18. This bar is to assist the locking-bar in holding the gate-sections against separation, but principally for the purpose of preventing horses and cattle from bringing too strong pressure, in attempting to get over, against the locking-bar.

22 denotes bolts which extend diagonally through the heads 20 and have at their lower ends nuts 23 and at their upper ends eyes 24, with which is connected a barbed wire 25, which extends from head to head and will prevent an animal from attempting to thrust its head and neck over said bar. When the gate is closed or when it is not desired to use this bar, it may be conveniently connected to the gate-section, as shown in Fig. 4, by the supporting-brackets 26 and turn-button 27.

The vertical stiles of each gate-section are preferably connected by a through-bolt 28, the inner end of which instead of being formed with the customary polygonal head is formed with an eye 29, so that when the gate-sections are closed and these eyes are brought close together a padlock 30 may be used for securing the sections together against the admission of any one unless provided with a key for opening said lock. Thus do the rods serve two functions—namely, means for securely connecting the vertical stiles of each gate-section and means by which said sections may be held together in locked and closed position.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with sliding gate-sections provided with keepers, of a locking-bar mounted in said keepers and provided with recesses or corrugations in its edge, and a curved key to wedge between the said keepers and said recesses, substantially as set forth.

2. The combination with roller-supported sliding gate-sections and keepers for guiding said sections in their sliding movement, of a guard-bar spanning the opening between the same, and means for holding the gate-sections spaced apart, substantially as set forth.

3. The combination with roller-supported sliding gate-sections and keepers for guiding said sections in their sliding movement, of a guard-bar spanning the opening between the same, and means for holding the gate-sections spaced apart, said means consisting of shoulders carried by said gate-sections engaging recesses formed in the said bar, substantially as set forth.

4. A guard-bar for the purpose set forth, having elevated heads at its ends, bolts extending diagonally through said heads and provided with nuts at their lower ends and eyes at their upper ends, and a barbed wire having its ends connected to the eyes of said bolts, substantially as set forth.

5. The combination with sliding gate-sections, of rods connecting their vertical stiles, the outer ends of which are provided with threads to receive nuts and the inner ends of which are provided with eyes, and means for connecting the eyes together, substantially as set forth.

6. A gate-section provided with brackets and a turn-button adapted to support and retain a guard-bar, in combination with said guard-bar, substantially as set forth.

7. The combination with a sill, the gate-posts and the stop-posts, of sliding gate-sections carrying rollers to engage the sills, and keepers connecting said gate-sections with said gate-posts, a set of keepers carried by the gate-sections, a movable locking-bar engaged with said keepers and provided with recesses or corrugations in its upper edge, and curved keys adapted to be inserted between said last-named keepers and the walls of said recesses or corrugations and lock the bar in adjusted position, substantially as set forth.

DANIEL M. COX.

Witnesses:
W. R. NATAW,
J. E. NATAW.